United States Patent [19]

Lauton et al.

[11] 4,202,838
[45] May 13, 1980

[54] SULPHONATED CONDENSATION PRODUCTS

[75] Inventors: Alain Lauton, St. Louis, France; Roland Putzar, Therwil, Switzerland; Hans-Ulrich Berendt, Allschwil, Switzerland; Gustaaf Scherer, Basel, Switzerland

[73] Assignee: Ciba-Geigy Corporation, Ardsley, N.Y.

[21] Appl. No.: 920,589

[22] Filed: Jun. 29, 1978

Related U.S. Application Data

[63] Continuation of Ser. No. 736,643, Oct. 29, 1976, abandoned, which is a continuation of Ser. No. 659,388, Feb. 19, 1976, abandoned, which is a continuation of Ser. No. 410,749, Oct. 29, 1973, abandoned.

[30] Foreign Application Priority Data

Nov. 3, 1972 [CH] Switzerland .................. 16042/72

[51] Int. Cl.$^2$ .................. C07C 143/24; C07C 143/42; C09B 67/00
[52] U.S. Cl. .................. 260/505 C; 260/512 C; 8/589
[58] Field of Search .................. 260/505 C, 512 C

[56] References Cited

U.S. PATENT DOCUMENTS

| | | | |
|---|---|---|---|
| 1,635,883 | 7/1927 | Daimler et al. | 260/505 C |
| 2,199,806 | 5/1940 | Mitchell | 260/505 C |

*Primary Examiner*—Alan Siegel
*Attorney, Agent, or Firm*—Prabodh I. Almaula

[57] ABSTRACT

Sulphonated condensation products which are obtained, irrespective of sequence, by reaction of an aromatic compound that contains at least two replaceable hydrogen atoms in the nucleus with a compound of the formula

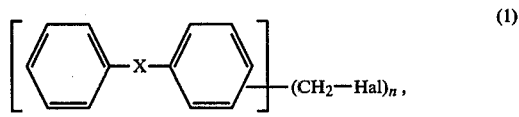

wherein X represents the direct bond or oxygen, Hal represents chlorine or bromine, and n is a number from 1 to 4, and sulphonation, and optionally by further condensation with formaldehyde or formaldehyde donors.

The sulphonated condensation products are particularly effective as levelling agents and dispersants.

11 Claims, No Drawings

SULPHONATED CONDENSATION PRODUCTS

This is a continuation of application Ser. No. 736,643 filed on Oct. 29, 1976 now abandoned, which is a continuation of application Ser. No. 659,388, filed Feb. 19, 1976, now abandoned, which is a continuation of application Ser. No. 410,749, filed Oct. 29, 1973, now abandoned.

The present invention relates to new sulphonated condensation products, process for the manufacture of these compounds, and to their use as anionic dispersing and levelling agents for water-soluble dyestuffs or preferably for dyestuffs that are sparingly soluble or insoluble in water.

The sulphonated condensation products according to the present invention are characterised in that they are obtained, irrespective of sequence, by reaction of an aromatic compound containing at least two replaceable hydrogen atoms in the nucleus with a compound of the formula

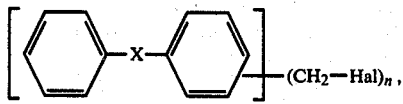

wherein X represents the direct bond or oxygen, Hal represents chlorine or bromine, and n is a number from 1 to 4, and by sulphonation and optionally further condensation with formaldehyde or formaldehyde donors These condensation products are conveniently manufactured by reacting an aromatic compound that contains at least two replaceable hydrogen atoms in the nucleus with a compound of the formula (1), subsequently sulphonating the resulting condensation product, and optionally further condensing the sulphonation product with formaldehyde or formaldehyde donors.

It is possible to manufacture certain condensation products of the indicated type by reacting a sulphonated aromatic compound that contains at least two replaceable hydrogen atoms in the nucleus with a compound of the formula (1), and optionally further condensing the sulphonated condensation product with formaldehyde or formaldehyde donors.

The aromatic compounds containing at least two replaceable hydrogen atoms that are used as starting materials in the manufacture of the condensation products can be mononuclear or polynuclear, especially binuclear, hydrocarbons that are optionally substituted. Possible substituents are e.g. hydroxyl, alkyl groups with 1 to 4 carbon atoms, alkoxy groups with 1 to 4 carbon atoms, or halogen, e.g. chlorine, Naphthalene compounds that can be substituted by hydroxyl, chlorine, or methyl are preferred. As examples of mononuclear and polynuclear aromatic compounds there may be cited: alkylbenzenes, such as toluene, xylenes, isopropylbenzene, isobutylbenzene, tert. butylbenzene; phenols, chlorophenols, alkylphenols, such as methylphenol, dimethylphenol, isopropylphenol, tert. butylphenol, hydroxydiphenyls; alkoxybenzenes, such as anisols, phenetols, butoxybenzene, diphenylalkanes, hydroxydiphenylalkanes, tetrahydronaphthalene, naphthalene, α- and β-naphthol, alkylnaphthalenes, e.g. α- and β-methylnaphthalene, as well as acenaphthene, anthracene, perylene, pyrene, dihydrophenanthrene, or phenanthrene, Naphthalene, which can also be already sulphonated, is particularly suitable. It is of course also possible to use mixtures of these mononuclear and polynuclear aromatic compounds as starting materials.

the compounds of the formula (1) that are also required as starting materials are manufactured e.g. by reacting diphenyl or diphenyl ether with formaldehyde and hydrogen halide, such as hydrogen bromide or hydrogen chloride, according to the methods described in U.S. Pat. No. 3,004,072 or Italian patent No. 600,214.

Preferred starting materials of the formula (1) are chloromethyl diphenyl and chloromethyldiphenyl ether. These compounds are mostly isomer mixtures with 1 to 3 chloromethyl groups, these groups for example being preferably in the ortho- and para-position of both benzene rings. Accordingly, the sulphonated condensation products of the present invention are also as a rule in the form of mixtures, especially mixtures of monosubstituted to trisubstituted diphenyl or diphenyl ether products. The ratio of the isomers to each other changes depending on the starting materials and the chosen reaction conditions during the manufacture of the condensation products according to the invention. If n is 1, p-isomers are advantageously obtained in amounts of e.g. 30 to 90% and o-isomers in amounts of e.g. 70 to 10%. If n is 2, there are obtained e.g. p,p'-, o,o'- or o,p'-compounds.

The amounts of the different isomers in the mixtures of the condensation products according to the invention can be determined by chromatography or nuclear magnetic resonance spectroscopy.

The aromatic compounds as defined herein are reacted with the compounds of the formula (1) advantageously in acid medium, e.g. in the presence of acid condensation agents or of dehydrating agents that show acid reaction, the reactants being used in equivalent amounts or the aromatic compound in an excess. Examples of suitable condensation agents are hydrochloric acid, iron(III) chloride, zinc chloride, aluminium chloride, phosphorus pentoxide, phosphoric acid, chlorosulphonic acid, or oleum. However, the preferred condensation is concentrated to anhydrous sulphuric acid (96 to 100%).

The condensation temperature can vary within wide limits and depends chiefly on the condensation agent used. In concentrated sulphuric acid the exothermic reaction proceeds rapidly and completely, mostly at temperatures of 40° to 160° C., and accompanied by the vigorous evolution of hydrogen chloride. In some cases it is necessary to carry out the reaction at still higher temperatures up to 200° C. When using Friedel-Craft catalysts such as iron(III) chloride, zinc chloride or aluminium chloride, the process is carried out at temperatures of 70° to 120° C.

The sulphonation of the starting materials or of the condensation products is carried out advantageously by known methods, for example in concentrated sulphuric acid, oleum, or chlorosulphonic acid. Accordingly, temperatures between 20° to 200° C., but preferably between 60° and 140° C., are used with advantage.

A technically very simple, and therefore preferred, method of manufacturing the condensation products according to the invention, consists in the sulphonation and condensation of the reactants in the same concentrated or anhydrous sulphuric acid without isolation of intermediate products.

The finished reaction products are precipitated e.g. by treating the sulphuric acid solutions or suspensions with ice water, then converted in the usual manner into the water-soluble salts, e.g. alkali metal, alkaline earth metal, and ammonium salts, and these are then isolated. By ammonium salts are meant in addition to the ammonium salt also the alkylammonium, and hydroxyalkylammonium salts, e.g. trimethyl-, triethyl-, β-hydroxyethyl- or bis-(β-hydroxyethyl) ammonium salts. The sodium and potassium salts are preferred.

The sulphonated condensation products according to the invention correspond preferably to the formula

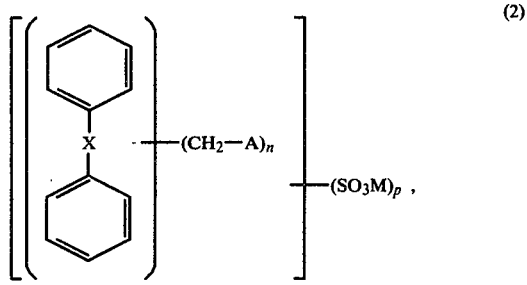

wherein X represents the direct bond or oxygen, A represents the radical of an aromatic compound that is bonded to the methylene group via a ring carbon atom, M represents hydrogen or a salt-forming cation, e.g. alkali metals, alkaline earth metals or ammonium groups, and n and p are numbers from 1 to 4.

In addition, n and p are preferably 1 or 2, but they can also be any fractional number from 1 to 4, e.g. 1.4, 1.8, 2.1, or 3.2.

It is possible to obtain further condensation products according to the invention of the formula

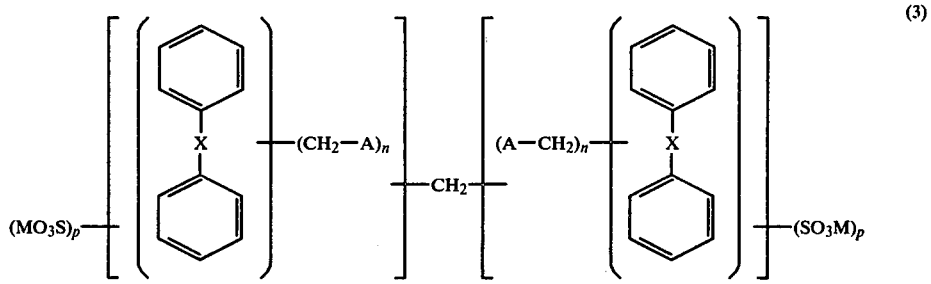

by reacting condensation products of the formula (2) with formaldehyde or formaldehyde donors. In this formula, X, A, n, and p have the meanings given under formula (2). These products are obtained preferably by reacting 2 equivalents of the condensation products of the formula (2) with 1 to 2, preferably 1 to 1.2, equivalents of formaldehyde or formaldehyde donors, advantageously at temperatures of 40° to 100° C. Suitable formaldehyde donors are chiefly trioxan, paraformaldehyde, and hexamethylenetetramine. The reaction is conveniently carried out by using acid condensation agents, in particular concentrated to anhydrous sulphuric acid.

The condensation products of the formulae (2) and (3), wherein A represents a naphthyl radical, are particularly effective as levelling agents and, above all, as dispersing agents.

Water-soluble condensation products according to the invention can be used as dispersing agents for anionic and cationic dyestuffs. However, they are used preferably whereever it is necessary to convert sparingly soluble to insoluble dyestuffs into fine aqueous dispersions. It is therefore possible, for example, to manufacture with vat dyestuffs dispersions that can then, for example by the conventional methods, be applied and vatted to textiles, preferably cellulose fibres. Furthermore, the new sulphonated condensation products are suitable for manufacturing aqueous pigment dispersions.

Above all, however, they prove to be very valuable dispersants for disperse dyes and especially in the dyeing and printing of synthetic fibre material with disperse dyes. These dyes can belong to the most diverse classes. e.g. azo, anthraquinone, acridone, nitro, methine, styryl, azostyryl, naphthoperinone, cumarine, quinophthalone, or naphthoquinone-imine dyes.

As fibre materials that can be dyed with disperse dyes there may be mentioned: cellulose acetate fibres, including triacetate fibres, synthetic polyamide fibres, e.g. those from ε-caprolactam, from adipic acid and hexamethylenediamine, from ω-aminoundecanoic acid, polyurethane, polyolefine, polyacrylonitrile fibres, and, above all, linear polyester fibres, in particular from polyethylene glycol terephthalate or poly-(1,4-cyclohexane-di-methylolterephthalate).

These materials can also consist of blends with one another or with other fibres, e.g. polyester/wool, polyester/cotton, or polyester/polyacrylonitrile blend.

The condensation products can be added for example to the dyebaths and printing pastes used for dyeing or printing the cited fibre materials with disperse dyes in the conventional manner. It is therefore possible, advantageously in batchwise operation, to apply an aqueous preparation that contains disperse dye and a condensation product according to the invention, to fibre material, e.g. woven material, made of polyester fibres, and, after drying it, subjecting the treated material for a brief time to an elevated temperature, e.g. about 200° C.

The condensation products of the indicated composition prove particularly advantageous in the dyeing of polyester fibres with disperse dyes accompanied by the use of carriers at temperatures below 100° C., or in the high temperature process in sealed vessels under pressure and at temperatures of over 100° C., advantageously between 110° and 140° C. The liquor ratio can accordingly be chosen within a wide range, e.g. 1:4 to 1:100, preferably 1:10 to 1:50.

As a rule, the material to be dyed, which can be in the form of e.g. loose material, hanks, pieces, or in the form of spools, lies in the dyeing apparatus and the liquor circulates through it. It is important not only that a fine dispersion of the dye is present initially, but that the degree of dispersion is also maintained during the entire dyeing process. Certain disperse dyes have a tendency to pass over into a less fine form under the conditions of high-temperature dyeing. The consequence thereof is that the dye no longer exhausts on to the fibres and deposits on the surface of the material. Such dye deposite can be easily avoided by the use of the condensation products according to the invention.

The dispersion of the dyes that are sparingly soluble to insoluble in water is obtained by using for example 50 to 500% of new condensation product, based on the amount of dye. The dye and the new condensation product can be processed to a stable preparation that can be in anhydrous or hydrated form, e.g. a paste. However, it is also possible to use dyes mixed with other dispersants for dyeing by adding to these preparations condensation products according to the invention, e.g. during the preparation of the dyebath.

In every case there is observed an improvement in the dyeing process on using the anionic condensation products according to the invention, if the addition of conventional dispersants to the dyebath is taken as comparison.

The advantages are that the troublesome foam formation during the dyeing is reduced and that the dyes are exhausted almost completely on to the textile material. Moreover, compared with known dispersants the condensation products according to the invention are less poisonous to fish. Further, owing to the good dispersing and levelling action of the condensation products according to the invention, deep and level dyeings are obtained within shorter dyeing times then the customary ones.

The following Examples illustrate the invention without being in any way limitative thereof. Percentages are by weight throughout.

EXAMPLE 1

64 g of naphthalene are warmed to 60° C. Within 20 minutes there are simultaneously added dropwise to the heated naphthalene 65 g of 100% sulphuric acid and 68 g of a chloromethyl-diphenyl ether mixture manufactured according to U.S. Pat. No. 3,004,072 and consisting of
15% of p-chloromethyl-diphenyl ether
5% of o-chloromethyl-diphenyl ether
36% of o,p'-bis-chloromethyl-diphenyl ether
40% of p,p'-bis-chloromethyl-diphenyl ether
4% of higher isomers.
The temperature thereupon rises to 95° C. and hydrogen chloride is evolved. The temperature of the reaction mixture is raised still further to 160° C. and maintained thereat for 1½ hours. The reaction mixture is then cooled to 100° C. and treated with 200 g of water. The acid solution is neutralised with 88 g of 30% aqueous sodium hydroxide solution. The suspension is then filtered at 70° C. and the filtrate is evaporated to dryness.

There are obtained 140 g of a readily water-soluble mixture of the sodium salts of the sulphonated naphthalenechloromethyl-diphenyl ether condensation product, which has a surface tension of 52.4 dyn/cm and is highly suitable as a dispersant for dyes that are sparingly soluble in water.

If the acid solution is neutralised with 40.3 g of ethanolamine instead of with 88 g of 30% sodium hydroxide, there are obtained—after filtering the solution and evaporating the filtrate to dryness—165 g of a readily water-soluble mixture of the ethanolamine salt of the sulphonated naphthalenechloromethyl-diphenyl ether condensation product.

EXAMPLE 2

65 g of a chloromethyl-diphenyl mixture consisting of
7% of o-chloromethyl-diphenyl
22% of p-chloromethyl-diphenyl
10% of o,o'-bis-chloromethyl-diphenyl
25% of o,p'-bis-chloromethyl-diphenyl
7% of p,p'-bis-chloromethyl-diphenyl and
29% of higher isomers
and 83.2 g of chlorosulphonic acid are added dropwise simultaneously at 15° C. within 2 hours to 72 g of $\beta$-naphthol in 150 ml of dichloroethane. The temperature therefrom rises to 25° C. and hydrogen chloride is evolved. The temperature is raised to 60° C. and kept thereat for 1 hour. The sulphuric acid solution is subsequently diluted with 200 g of water and the resulting emulsion is neutralised with 83 ml of 30% sodium hydroxide solution. The emulsion is filtered and the dichloroethane isolated. The aqueous phase is then evaporated to dryness, to yield 185 g of readily water-soluble salts of the condensation product mixture. Surface tension: 55.6 dyn/cm.

EXAMPLE 3

64 g of naphthalene is heated to 70° C. While stirring, 65 g of sulphuric acid monohydrate and 65 g of the chloromethyl-diphenyl mixture used in Example 2 are added dropwise simultaneously within 30 minutes. The reaction temperature rises to 100° C. accompanied by evolution of hydrogen chloride. The temperature is raised to 160° C. and the reaction mixture is kept for 1½ hours at this temperature, the turbid mixture turning to a clear solution in the process. The reaction mixture is cooled to 100° C. and then 200 g of water are added thereto. The acid solution is neutralised with 88 g of 30% sodium hydroxide solution and the resulting emulsion is filtered at 70° C. The filtrate is subsequently evaporated to dryness.

In this manner there are obtained 170 g of a very readily water-soluble product that has a surface tension of 58.4 dyn/cm and, depending on the fibre material and dye used, is a good dispersant, levelling agent, and retarding agent in dyeing.

EXAMPLE 4

66 g of 1,2,3-tetrahydronaphthalene are warmed to 70° C. While stirring, 15 g of 100% sulphuric acid and 62 g of the chloromethyl-diphenyl mixture used in Example 2 are added dropwise simultaneously. The temperature thereupon rises to 140° C. and hydrogen chloride is liberated simultaneously. The mixture is stirred for 2 hours at 140° C. Then 200 g of water are added and the mixture is neutralised with 88 g of 30% sodium hydroxide solution. The neutral solution is filtered off and the filtrate is evaporated to dryness to yield 160 g of a product mixture that is a very effective dispersant. Surface tension: 51.9 dyn/cm.

EXAMPLE 5

47 g of phenol are warmed to 70° C., then 5 g of sulphuric acid monohydrate are added. To the mixture are added immediately 65 g of the chloromethyldiphenyl mixture used in Example 2 and 50 g of oleum (65%). The temperature is raised to 115° C. kept thereat for 2 hours. The reaction mixture is then cooled to 100° C. and 200 g of water are added. The mixture is neutralised with 93 g of 30% sodium hydroxide and filtered. The filtrate is evaporated to dryness to yield 140 g of a water-soluble product that can be used as a resisting agent. Surface tension: 52 dyn/cm.

EXAMPLE 6

While stirring, 10 g of 100% sulphuric acid and 22 g of a polychloromethyldiphenyl ether mixture used in Example 1 are added dropwise simultaneously at 80°–100° C. to 32 g of an isomeric xylene mixture, whereupon evolution of hydrogen chloride occurs. Then 32 g of sulphuric acid monohydrate are added, the temperature is raised to 120° C. and the reaction mixture is kept for 5 hours at this temperature. The sulphuric acid solution is treated with 100 g of water and neutralised with 60 g of 30% sodium hydroxide solution. The neutral solution is filtered and evaporated to dryness, to yield 80 g of a readily water-soluble sodium sulphonate of the condensation product mixture. Surface tension: 42.6 dyn/cm.

EXAMPLE 7

76 g of 2-methylnaphthalene are warmed to 80° C. While stirring, 66 g of sulphuric acid monohydrate and 65 g of the chloromethyl-diphenyl ether mixture used in Example 1 are simultaneously added dropwise within 45 minutes, whereupon vigorous evolution of hydrogen chloride occurs. The reaction temperature is raised to 145° C. and stirring is continued for 2 hours at this temperature, in the course of which a solution forms. After it has been cooled to 100° C. the acid solution is diluted with 200 g of water and neutralised with 90 g of 30% sodium hydroxide solution. The neutral solution is then filtered and the filtrate evaporated to dryness, to yield 165 g of a readily water-soluble condensation product mixture.

EXAMPLE 8

114 g of 2,2-bis-(4'-hydroxyphenyl)-propane are heated to 90° C. While stirring, 70 g of sulphuric acid monohydrate and 50 g of the chloromethyl-diphenyl ether mixture used in Example 1 are simultaneously added dropwise, whereupon hydrogen chloride is liberated. Upon addition of a further 30 g of 100% sulphuric acid the reaction temperature is raised to 130° C. and kept thereat for 2 hours. Then 200 g of water are added and the acid solution is neutralised with 140 g of 30% sodium hydroxide solution. Finally, the neutral solution is filtered and the filtrate is evaporated to dryness, to yield 235 g of a readily water-soluble condensation product that can be used as resisting agent.

EXAMPLE 9

35 g of phenol and 35 g of 2,2-bis-(4-hydroxyphenyl)-propane are heated to 90° C. Then 65 g of the chloromethyl-diphenyl mixture used in Example 2 and 65 g of oleum (65%) are simultaneously added dropwise, whereupon hydrogen chloride is evolved. The temperature is raised to 115° C. and the reaction mixture is stirrred for 2 hours at this temperature. The reaction mixture is then cooled to 100° C. and 200 g of water are added. The acid solution is neutralised with 110 g of 30% sodium hydroxide solution and the neutral solution is filtered. The filtrate is evaporated to dryness to yield 160 g of a mixture that is readily soluble in water. Surface tension: 44 dyn/cm.

EXAMPLE 10

64 g of naphthalene are warmed to 60° C. While stirring, 65 g of sulphuric acid monohydrate and 95 g of a chloromethyl-diphenyl ether mixture, consisting of 70% of p-chloromethyl-diphenyl ether and 30% of o-chloromethyl-diphenyl ether, are simultaneously added dropwise within 20 minutes. The exothermic reation causes the temperature to rise to 95° C. and simultaneous evolution of hydrogen chloride occurs. The temperature of the reaction mixture is raised to 160° C. and the mixture is stirred for 1½ hours at this temperature. The reaction mixture is cooled to 100° C. and then 50 g of water are added. 10 g of 96% sulphuric acid and 45 g of an aqueous 35.7% formaldehyde solution are then added. The reaction mixture is stirred for 15 hours at 95° C., then poured on 200 g of ice, and the acid solution is neutralised with 105 g of 30% sodium hydroxide solution. Insoluble constituents are filtered off and the filtrate is evaporated to dryness.

There are obtained 175 g of a condensation product that is readily soluble in water. Depending on the fibre material and dye used, this product is a good dispersant, levelling agent, and retarding agent in dyeing.

EXAMPLE 11

64 g of naphthalene are warmed to 70° C. Then 65 g of sulphuric acid monohydrate and 70 g of the chloromethyl-diphenyl mixture used in Example 2 are simultaneously added dropwise, whereupon the reaction temperature rises to 100° C. and hydrogen chloride is evolved. The reaction mixture is heated further to 160° C. and kept for 1½ hours at this temperature. It is cooled to 100° C., then 100 g of water and 10 g of 95% sulphuric acid are added. Then 45 g of an aqueous 37.5% formaldehyde solution are added. The reaction mixture is stirred for 15 hours at 90° C., then 200 g of ice water are added and the acid mixture is neutralised with 105 g of 30% sodium hydroxide solution. The mixture is filtered and the filtrate then evaporated to dryness.

There are obtained 170 g of a condensation product that is readily soluble in water (surface tension: 64.2 dyn/cm). Depending on the fibre material and dye used, this product is a good dispersant, levelling agent, and retarding agent.

EXAMPLE 12

65 g of p-chlorophenol are warmed to 60° C. Within 1½ hours 65 g of oleum (65%) and 65 g of a chloromethyl-diphenyl mixture consisting of
10.3% of cyclohexane
14.7% of o-chloromethyl-diphenyl
11.1% of p-chloromethyl-diphenyl
3.5% of o,o'-(dichloromethyl)diphenyl
26.3% of o,p'-di(chloromethyl)diphenyl
13.8% of p,p'-di(chloromethyl)diphenyl and
19.8% of higher isomers
are simultaneously added dropwise to the heated p-chlorophenol, whereupon a vigorous evolution of hydrogen chloride is observed. The reaction mixture is then heated to 120° C. and kept for 2 hours at this temperature. It is cooled and then treated with 200 g of water. The acid solution is subsequently brought to a pH of 7.5 to 8 with 75 ml of 30% sodium hydroxide solution. The solution is filtered and the filtrate evaporated to dryness, to yield 165 g of a water-soluble light brown powder. Surface tension: 50.8 dyn/cm.

EXAMPLE 13

65 g of α-chloronaphthalene are heated to 70° to 80° C. Then 60 g of sulphuric acid monohydrate and 50 g of the chloromethyl-diphenyl mixture used in Example 12 are simultaneously added dropwise within 20 minutes. The reaction mixture is subsequently heated to 160° C. and stirred for 2 hours under reduced pressure, during which time the cyclohexane is distilled off. The reaction mixture is then cooled to 100° C., treated with 200 ml of water, and brought to a pH of 7.5 to 8 with 30% sodium hydroxide solution. The solution is filtered and the filtrate is evaporated to dryness to yield 150 g of water-soluble brown powder. Surface tension: 56.4 dyn/cm.

EXAMPLE 14

56 g of anisole are heated to 80° C. Then 73 g of the chloromethyl-diphenyl mixture used in Example 12 and 69 g of sulphuric acid monohydrate are simultaneously added dropwise within 2 hours, whereupon hydrogen chloride is evolved. The reaction mixture is heated to 140° C. under reduced pressure and the cyclohexane is distilled off. After 2 hours the reaction mixture is cooled to 90° C., treated with 200 ml of water, and brought to a pH of 7.5 with 30% sodium hydroxide solution. The dark brown viscous solution is filtered hot and the filtrate is evaporated to dryness. There are obtained 165 g of a yellowish brown powder that is readily soluble in water. Surface tension: 54.7 dyn/cm.

EXAMPLE 15

54 g of o-cresol are heated to 85°-90° C. Then 70.5 g of the chloromethyl-diphenyl mixture used in Example 12 and 68.5 g of sulphuric acid monohydrate are simultaneously added dropwise within 40 minutes, whereupon hydrogen chloride is evolved. The cyclohexane contained in the chloromethyl-diphenyl mixture is then distilled off under vacuum and stirring of the reaction mass is continued for 2 hours at 115° C.

The reaction mixture is subsequently treated with 200 ml of water and brought to a pH of 7.2 with 30% sodium hydroxide solution. The water is distilled off under vacuum to leave as residue 180.8 g of a sulphonated cresylmethyl-diphenyl mixture. Surface tension: 55.2 dyn/cm.

EXAMPLE 16

14 g of the sulphonated condensation product manufactured according to Example 3 together with 20 g of the dye 1-amino-2-β-hydroxyethoxy-4-hydroxy-anthraquinone, 28.6 g of the sodium salt of a lignin sulphonate, and 138 g of water are ground in the usual manner for 21 hours in a mill to a fine dispersion. The ground product is subsequently dried in a spray drier. This dyestuff preparation is very suitable for a high-temperature circulation dyeing on polyethylene glycol terephthalate fibres. No agglomeration of the dye occurs during the dyeing and thereby also no deposit on the substrate. The resulting rose coloured dyeing is level and fast to rubbing. A comparison preparation of the same dye with the lignin sulphonate and without the sulphonated condensation product gives on the other hand a dyeing with insufficient fastness to rubbing.

EXAMPLE 17

A dyestuff preparation that also produces a rose coloured dyeing on polyethylene glycol terephthalate fibres in the high-temperature circulation dyeing process is obtained by substituting 14 g of the sulphonated condensation product of Example 11 for the sulphonated condensation product used in Example 16 and otherwise carrying out the process as described in Example 16.

EXAMPLE 18

12.5 g of the dyestuff 1-amino-2-β-hydroxyethoxy-4-hydroxy-anthraquinone, 25 g of the condensation product manufactured according to Example 13, and 87.5 g of water are ground in the customary manner in a mill for 20 hours to a fine dispersion. The ground product is subsequently dried in a spray drier.

This dyestuff preparation is very suitable for a high-temperature circulation dyeing on polyethylene glycol terephthalate fibres. No agglomeration of the dispersed dye occurs during the dyeing and thereby also no deposit of the dye on the substrate. The resulting rose coloured dyeing is level and fast to rubbing.

EXAMPLE 19

15.6 g of a dyestuff mixture of the composition

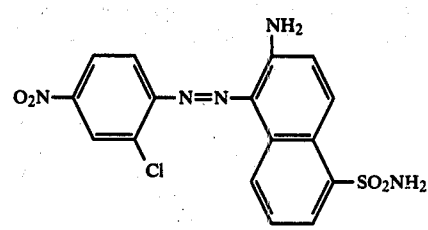

and

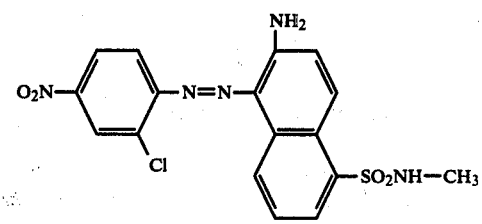

and 23.4 g of the condensation product manufactured according to Example 13 together with 91 g of water are ground to a fine dispersion in the customary manner in a mill for 7 hours. The ground product is subsequently dried by spray dyeing.

This dyestuff preparation is very suitable for a high-temperature circulation dyeing on polyethylene glycol terephthalate fibres. No agglomeration of the dye occurs during the dyeing and thereby also no deposit of the dye on the substrate. The resulting red coloured dyeing is level and fast to rubbing.

EXAMPLE 20

25 g of a knitted fabric made of polyethylene glycol terephthalate are treated for 5 minutes at 60° C. in a bath that contains, dissolved in 300 ml of water, 0.167 g of the sulphonated condensation product manufactured according to Example 3 and 0.667 g of ammonium sulphate and is adjusted to pH 5.5 with 85% formic acid. Then 0.6 g of an isomer mixture of the dye of the formula

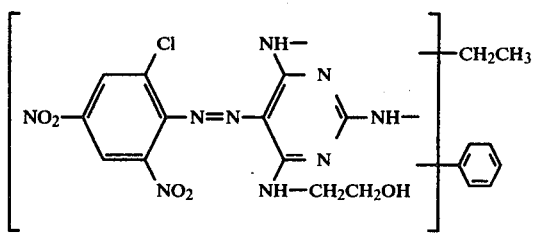

is added. The bath temperature is raised to 130° C. within 30 minutes and dyeing is performed for 60 minutes at this temperature. The bath is cooled to 90° C., the dyed knitted fabric then removed, rinsed with water, and then dried. A level red dyeing of good penetration and good fastness to rubbing is obtained.

EXAMPLE 21

100 g of a knitted fabric made from polyamide 66 are treated for 10 minutes at 40° C. in a bath that contains 6 g of the sulphonated condensation product maintained according to Example 3 dissolved in 4000 ml of water and is adjusted to pH 4 with acetic acid. Then 0.3 g of the dye of the formula

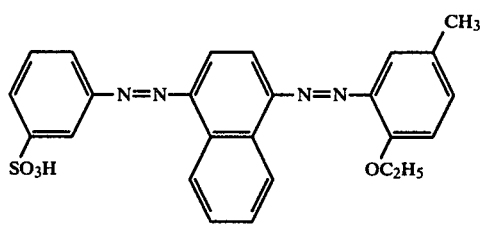

and 0.3 g of the dye of the formula

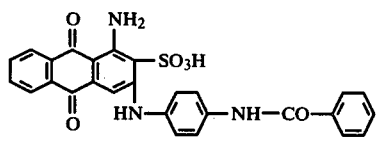

are added and stirring is continued for 10 minutes at 40° C. The bath temperature is then raised to 98° C. within 30 minutes and dyeing is performed for 60 minutes at boiling temperature. The bath is cooled, the dyed knitted fabric then removed, rinsed with water in the usual way and then dried. A level non-stripy, green dyeing of good penetration is obtained.

EXAMPLE 22

100 g of a polyacrylonitrile fabric (Orlon 42) are put at 98° C. into a dyebath that contains dissolved in 4000 ml of water 1.5 g of a dyestuff mixture consisting of 25 parts of a dye of the formula

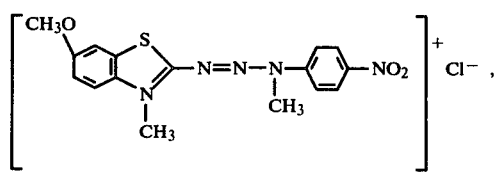

10 parts of a dye of the formula

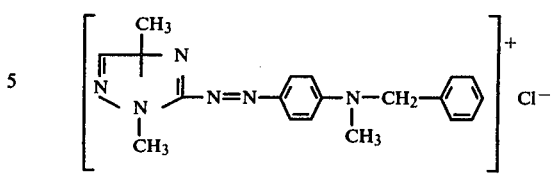

and 65 parts of a dye of the formula

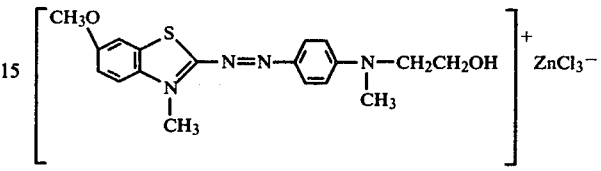

and 2 g of the sulphonated condensation product manufactured according to Example 11, and that is adjusted to pH 4 with acetic acid. After a dyeing time of 2½, 5, 10, 15, 25, and 40 minutes respectively, 1/12 of the fabric is removed from the bath on each occasion. The remaining 6/12 are dyed for a total of 60 minutes at 98° C. and finished in the usual way. The gradual tone-in-tone exhaustion produces a level grey dyeing.

EXAMPLE 23

Level grey dyeings are also obtained by substituting 2 g of the sulphonated condensation product manufactured according to Example 3 for that in Example 22 manufactured according to Example 11, and otherwise carrying out the process as described in Example 22.

We claim:

1. A sulphonated condensation product, which is obtained, by reaction at 40° to 160° C. of a binuclear aromatic compound containing at least two replaceable hydrogen atoms in the nucleus, said binuclear aromatic compound being selected from the group consisting of diphenyl, naphthalene, tetrahydronaphthalene or naphthalene substituted by hydroxy, alkyl of 1 to 4 carbon atoms, alkoxy of 1 to 4 carbon atoms or halogen, with a compound of the formula

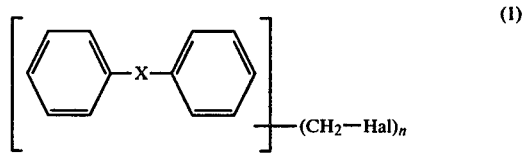

(1)

wherein X represents the direct bond or oxygen, Hal represents chlorine or bromine and n is a number from 1 to 4 and sulphonation with sulphuric acid, chlorosulphonic acid or oleum at 20° to 200° C.

2. A sulphonated condensation product according to claim 1, wherein naphthalene unsubstituted or substituted by hydroxyl, chlorine or methyl is reacted with a compound of formula (1) as defined in claim 1, and sulphonated.

3. A sulphonated condensation product according to claim 1, wherein binuclear aromatic compound is reacted with chloromethyl-diphenyl or chloromethyl-diphenyl ether or an isomer mixture thereof, each having 1 to 3 chloromethyl groups, and sulphonated.

4. A sulphonated condensation product according to claim 1, wherein naphthalene unsubstituted or substituted by hydroxyl, chlorine or methyl is reacted with chloromethyl-diphenyl or chloromethyl-diphenylether or an isomer mixture thereof, each having from 1 to 3 chloromethyl groups, and sulphonated.

5. A sulphonated condensation product according to claim 4 wherein sulphonated naphthalene is reacted with chloromethyldiphenyl or chloromethyldiphenyl ether or an isomer mixture thereof, each having 1 to 3 chloromethyl groups.

6. A sulphonated condensation product according to claim 1 wherein, irrespective of sequence, the aromatic compound that contains at least two replaceable hydrogen atoms in the nucleus is reacted with a compound of the formula (1) as defined in claim 1, and sulphonated, and the sulphonated condensation product is further condensed with formaldehyde or a formaldehyde donor.

7. A sulphonated condensation product according to claim 1 wherein, irrespective of sequence, a mononuclear or polynuclear aromatic hydrocarbon unsubstituted or substituted by hydroxyl, alkyl having 1 to 4 carbon atoms, alkoxy having 1 to 4 carbon atoms or halogen is reacted with a compound of formula (1) as defined in claim 1, and sulphonated and the sulphonated condensation product is further condensed with formaldehyde or a formaldehyde donor.

8. A sulphonated condensation product according to claim 1 wherein, irrespective of sequence, naphthalene unsubstituted or substituted by hydroxyl, chlorine or methyl is reacted with a compound of formula (1) as defined in claim 1, and sulphonated, and the sulphonated condensation product is further condensed with formaldehyde or a formaldehyde donor.

9. A sulphonated condensation product according to claim 1 wherein, irrespective of sequence, a mononuclear or polynuclear aromatic hydrocarbon unsubstituted or substituted by hydroxyl, alkyl having 1 to 4 carbon atoms, alkoxy having 1 to 4 carbon atoms or halogen is reacted with chloromethyldiphenyl or chloromethyldiphenyl ether or an isomer mixture thereof, each having from 1 to 3 chloromethyl groups, and sulphonated, and the sulphonated condensation product is further condensed with formaldehyde or a formaldehyde donor.

10. A sulphonated condensation product according to claim 9 wherein, irrespective of sequence, naphthalene unsubstituted or substituted by hydroxyl, chlorine or methyl is reacted with chloromethyldiphenyl or chloromethyldiphenyl ether or an isomer mixture thereof, each having from 1 to 3 chloromethyl groups, and sulphonated, and the sulphonated condensation product is further condensed with formaldehyde or a formaldehyde donor.

11. A sulphonated condensation product according to claim 10, wherein sulphonated naphthalene is reacted with chloromethyldiphenyl or chloromethyldiphenyl ether or an isomer mixture thereof, each having from 1 to 3 chloromethyl groups and the condensation product is further condensed with formaldehyde or a formaldehyde donor.

* * * * *